UNITED STATES PATENT OFFICE 2,325,760

CYCLIC ACETALS OF FORMALDEHYDE AND A PROCESS OF PREPARING THEM

Wilhelm Fitzky, Frankfort-on-the-Main-Hochst, Germany, assignor, by mesne assignments, to General Aniline & Film Corporation, New York, N. Y., a corporation of Delaware No Drawing. Application December 7, 1938, Serial No. 244,391. In Germany December 8, 1937

7 Claims. (Cl. 260—338)

The present invention relates to cyclic acetals of formaldehyde and to a process of preparing them.

I have found that during the treatment of aliphatic mono-olefinic hydrocarbons with formaldehyde in the presence of certain catalysts of an acid nature, such as zinc chloride, hydrochloric acid, sulphuric acid, acid potassium sulfate or acid sodium sulfate, phosphoric acid, phosphotungstic acid or strong organic acids and others, cyclic acetals of formaldehyde are formed, for instance according to the equation:

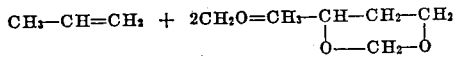

In this case the carbon chain is prolonged and at the same time the ring with 2 oxygen bridges is formed.

As aliphatic mono-olefinic hydrocarbons there may, for instance, be used: propylene, butylene-1.2, butylene-2.3, iso-butylene, the isomeric pentylenes, for instance trimethyl-ethylene of the formula

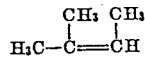

Instead of formaldehyde there may be used the known substances yielding formaldehyde, such as paraformaldehyde. The formaldehyde may be caused to react in the form of its aqueous solution.

If hydrochloric acid is used as a catalyst, it is suitable to carry out the reaction under mild conditions, for instance at a low temperature, and to interrupt it at the right time, because the cyclic acetals of formaldehyde are readily further transformed into chloro-alcohols. In this case a mercury salt may be added.

For the reaction about 2 mols of formaldehyde must be used for about 1 mol of the olefinic hydrocarbon. A small excess of formaldehyde is suitably applied. Suitable temperatures for the reaction are between room-temperature and about 150° C. The reaction is complete after all the formaldehyde or, if an excess of formaldehyde is used, substantially all the formaldehyde has been caused to react.

In order to accelerate the reaction between the olefine which is often in the gaseous state and the formaldehyde dissolved in water, it has been found to be advantageous to add an organic solvent which is indifferent to the reagents (formaldehyde, olefinic hydrocarbon and acid catalyst). The olefine, a part of the formaldehyde and a part of the catalyst are dissolved in this solvent and thereby the reaction is considerably accelerated. When the reaction is complete the formal is contained in the solvent and can be removed without difficulty from the aqueous layer containing the catalyst, for instance the lye of zinc chloride, and be separated by fractional distillation. The specific gravity of the solvent is preferably approximately equal to the specific gravity of the aqueous formaldehyde solution, whereby a large surface of contact is obtained even with little mechanical mixing.

As solvents there may for instance be used hydrocarbons, such as benzene, benzine, toluene and halogen hydrocarbons, such as methylene-chloride and dichloroethylene.

The action of the gaseous olefines is favorably influenced by the application of pressure.

The cyclic formals are valuable both as solvents and as intermediate products.

The following examples serve to illustrate the invention, but they are not intended to limit it thereto:

1. 100 grams of zinc chloride dissolved in 200 grams of water are mixed in an autoclave with 300 grams of paraformaldehyde, 800 grams of methylene chloride are added and 250 grams of propylene are introduced under pressure. The vessel is maintained for 12 hours at about 120° C. while stirring the reaction mixture. After cooling, the excess of propylene is blown off and the methylene chloride solution is separated into its constituents by fractionation. The butylene glycol-formal boiling between 112° C. and 117° C. is obtained in the first runnings, and thereafter there are obtained formals of a high boiling point in the form of a colorless liquid.

2. 500 grams of benzene are added to a solution of 100 grams of phosphotungstic acid in 800 grams of formaldehyde of 30 per cent. strength and 140 grams of isobutylene are introduced under pressure. The vessel is maintained for 12 hours at about 100° C. After the benzene has been distilled, isopentylene-glycolformal of the formula

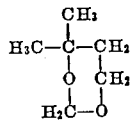

boiling at about 130° C. is obtained as a colorless liquid.

The process may also be carried out continuously in a tube, the olefine being passed through in a counter-current to the formaldehyde. In this case the organic solvent can be dispensed with if care is taken that the reacting materials are intimately mixed for instance by the use of Raschig rings.

3. 280 grams of trimethyl-ethylene are added, while vigorously stirring, to a mixture of 1 liter of aqueous formaldehyde solution of 30 per cent. strength and 240 cc. of concentrated hydrochloric acid in a flask provided with a reflux condenser. The reaction sets in very rapidly with a strong evolution of heat; it is terminated after 10 minutes. The water-insoluble part is separated from the mixture, the aqueous solution is extracted several times with ether, the ethereal solution is combined with the water-insoluble part and the whole is distilled. There is thus obtained in a yield of about 80 per cent. a compound of the formula

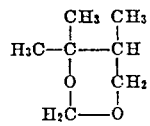

boiling at 150° C. to 155° C. and having an agreeable etherlike odor.

4. A mixture of 250 cc. of an aqueous formaldehyde solution of 30 per cent. strength, 12 grams of phosphoric acid and 56 grams of isobutylene is shaken in a pressure vessel at 80° C. The reaction is complete after one hour. The reaction mixture is mixed with potassium carbonate, whereby the compound formed separates in a quantity of 57 grams. It boils between 133° C. and 135° C. and corresponds to the product obtained according to Example 2.

5. A mixture of 500 cc. of an aqueous formaldehyde solution of 30 per cent. strength and 250 cc. of concentrated hydrochloric acid is shaken in a bulb-like shaking device with gaseous isobutylene which is absorbed briskly with evolution of heat. 55 liters thereof are thus taken up in the course of 8 hours. After the whole has been worked up in the manner described in Example 4, 105 grams of formal are obtained.

6. A mixture of 200 cc. of an aqueous formaldehyde solution of 30 per cent. strength, 90 grams of paraformaldehyde and 4 grams of concentrated sulfuric acid are shaken at 80° C. for two hours in a pressure vessel together with 112 grams of isobutylene. The non-dissolved portion is then separated. Further quantities of the insoluble portion may be separated by the addition of potassium carbonate to the aqueous solution. There are thus obtained 161 grams of ether boiling between 133° C. and 135° C. 12 grams of unaltered isobutylene and 23 grams of tertiary butylalcohol. The yield amounts to 94 per cent. of the theoretical yield after the unaltered isobutylene and the isobutylene to be recovered from the tertiary butylalcohol have been drawn off.

I claim:

1. The process of preparing cyclic acetals of formaldehyde which comprises reacting paraformaldehyde with propylene in the presence of an aqueous solution of zinc chloride and of methylene chloride at a temperature of about 120° C.

2. The process of preparing cyclic acetals of formaldehyde which comprises reacting an aqueous solution of formaldehyde with isobutylene in the presence of phosphotungstic acid and of benzene at a temperature of about 100° C.

3. The process of preparing cyclic acetals of formaldehyde which comprises reacting an aqueous solution of formaldehyde with trimethylethylene in the presence of hydrochloric acid.

4. The process of claim 1 in which the polybasic oxygenated mineral acid catalyst is sulfuric acid.

5. The process of claim 1 in which the polybasic oxygenated mineral acid catalyst is sulfuric acid and the compound employed is of the group consisting of formaldehyde and polymeric modifications thereof.

6. The process of claim 1 in which the compound employed is a member of the group consisting of formaldehyde and polymeric modifications thereof.

7. The process of preparing cyclic acetals of formaldehyde which comprises reacting, in the presence of water, a compound of the group consisting of formaldehyde and substances yielding formaldehyde with an aliphatic mono-olefinic hydrocarbon in the presence of a poly-basic oxygenated mineral acid catalyst, the reactants being employed in the ratio of at least two mols of formaldehyde to one mol of the olefine hydrocarbon, and separating the cyclic acetal from the reaction mass.

WILHELM FITZKY.

CERTIFICATE OF CORRECTION.

Patent No. 2,325,760.                                August 3, 1943.

WILHELM FITTKY.

It is hereby certified that error appears in the printed specification of the above numbered patent requiring correction as follows: Page 2, second column, lines 26, 29 and 34, for "claim 1" read --claim 7--; and that the said Letters Patent should be read with this correction therein that the same may conform to the record of the case in the Patent Office.

Signed and sealed this 18th day of January, A. D. 1944

(Seal)

Henry Van Arsdale,
Acting Commissioner of Patents.